(12) United States Patent
Trusov et al.

(10) Patent No.: US 10,584,967 B2
(45) Date of Patent: Mar. 10, 2020

(54) HEMISPHERICAL RESONATOR GYROSCOPE

(71) Applicants: Alexander Trusov, Woodland Hills, CA (US); David M. Rozelle, Woodland Hills, CA (US); David D. Lynch, Santa Barbara, CA (US)

(72) Inventors: Alexander Trusov, Woodland Hills, CA (US); David M. Rozelle, Woodland Hills, CA (US); David D. Lynch, Santa Barbara, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 504 days.

(21) Appl. No.: 15/296,774

(22) Filed: Oct. 18, 2016

(65) Prior Publication Data

US 2018/0231383 A1    Aug. 16, 2018

(51) Int. Cl.
 *G01C 19/5691* (2012.01)
(52) U.S. Cl.
 CPC ............................... *G01C 19/5691* (2013.01)
(58) Field of Classification Search
 CPC .................................................. G01C 19/5691
 See application file for complete search history.

(56) References Cited

U.S. PATENT DOCUMENTS

| 7,621,184 | B2 | 11/2009 | Caron |
| 7,637,157 | B2 | 12/2009 | Chikovani et al. |
| 7,874,209 | B2 | 1/2011 | Stewart |
| 8,205,495 | B2 | 6/2012 | Challoner |
| 8,763,441 | B2 | 7/2014 | Casinovi et al. |
| 2005/0092084 | A1* | 5/2005 | Fell ...................... G01C 19/567 73/504.13 |

(Continued)

FOREIGN PATENT DOCUMENTS

| JP | 2010066254 A | 3/2010 |
| JP | 2016156810 A | 9/2016 |

OTHER PUBLICATIONS

Final Office Action for U.S. Appl. No. 15/368,206 dated Jul. 11, 2019.

(Continued)

*Primary Examiner* — Xin Y Zhong
(74) *Attorney, Agent, or Firm* — Tarolli, Sundheim, Covell & Tummino LLP (57) ABSTRACT

One example includes a hemispherical resonator gyroscope (HRG). The HRG includes a sensing system comprising a plurality of electrodes arranged in a symmetrical annular arrangement about a sensitive axis and configured to electrostatically force a resonator into a substantially periodic motion based on a plurality of forcer signals applied to the plurality of electrodes. The plurality of electrodes are configured to provide an indication of rotation about a sensitive axis of the HRG. The HRG also includes a controller configured to generate the plurality of forcer signals in a phase-disparate manner to provide the substantially periodic motion in a vibration pattern such that a ratio of the plurality of electrodes and the vibration pattern is a non-integer number, and to measure the rotation about the sensitive axis of the HRG in response to the plurality of forcer signals.

13 Claims, 4 Drawing Sheets

(56) References Cited

U.S. PATENT DOCUMENTS

| | | | |
|---|---|---|---|
| 2006/0248953 A1* | 11/2006 | Lynch | G01C 19/02 73/504.12 |
| 2009/0158846 A1 | 6/2009 | Lignon et al. | |
| 2011/0239763 A1 | 10/2011 | Shkel et al. | |
| 2017/0363423 A1 | 12/2017 | Dormody et al. | |

OTHER PUBLICATIONS

Japanese Office Action for Application No. 2017-201755 dated May 31, 2019.

* cited by examiner

HEMISPHERICAL RESONATOR GYROSCOPE

TECHNICAL FIELD

This disclosure relates generally to sensing systems, and more specifically to a hemispherical resonator gyroscope.

BACKGROUND

There are a number different types of gyroscopes that are configured to calculate rotation about a sensitive (i.e., input) axis. One type of gyroscope is a Coriolis vibratory gyroscope (CVG). One example of a CVG is a tuning fork gyroscope in which two masses (e.g. tines) can vibrate in plane along a drive axis. In response to an applied angular rate about an input axis parallel to the tines of the tuning fork, Coriolis forces cause the tines to vibrate out of plane along a sense axis (e.g., 90° relative to a drive axis). The amplitude of the out-of-plane motion in open loop instruments or the force required to rebalance and null the out-of-plane motion in closed-loop instruments can correspond to a measure of the angular rate applied about the input axis. Another example of a CVG is a Hemispherical Resonator Gyroscope (HRG) in which a "wine glass" shaped resonator is caused to vibrate at a fundamental resonant frequency. In a fundamental or N=2 mode, the displacement of points on the vibrating resonator is in the form of a standing wave with antinodes and nodes that are separated by 45° in the circumferential direction. In force-rebalance operation, one of the antinodes can be maintained along a drive axis. In an HRG, an angular rotation applied about the axis of symmetry of the resonator (e.g., input axis) can cause the standing wave to lag in angular displacement relative to the housing, which can thus be indicative of rotation of the HRG about the sensitive axis.

SUMMARY

One example includes a hemispherical resonator gyroscope (HRG). The HRG includes a sensing system comprising a plurality of electrodes arranged in a symmetrical annular arrangement about a sensitive axis and configured to electrostatically force a resonator into a substantially periodic motion based on a plurality of forcer signals applied to the plurality of electrodes. The plurality of electrodes are configured to provide an indication of rotation about a sensitive axis of the HRG. The HRG also includes a controller configured to generate the plurality of forcer signals in a phase-disparate manner to provide the substantially periodic motion in a vibration pattern such that a ratio of the plurality of electrodes and the vibration pattern is a non-integer number, and to measure the rotation about the sensitive axis of the HRG in response to the plurality of forcer signals.

Another example includes a method for measuring rotation about a sensitive axis of an HRG. The method includes generating a plurality of forcer signals having respective voltages that are based on a respective plurality of distinct equations. The method also includes providing the plurality of forcer signals to at least a portion of eight electrodes associated with the HRG, the eight electrodes being arranged in a symmetrical annular arrangement about the sensitive axis and being configured to electrostatically force a resonator into a substantially periodic N=3 motion based on the plurality of forcer signals applied to the at least a portion of the eight electrodes. The method further includes measuring a pickoff associated with at least a portion of the eight electrodes in response to the substantially periodic N=3 motion to measure the rotation about the sensitive axis.

Another example includes an HRG. The HRG includes a sensing system comprising eight electrodes arranged in a symmetrical annular arrangement about a sensitive axis and configured to electrostatically force a resonator into a substantially periodic N=3 motion based on a plurality of forcer signals applied to the eight electrodes. The plurality of electrodes are configured to provide an indication of rotation about a sensitive axis of the HRG. The HRG also includes a controller configured to generate the plurality of forcer signals in a phase-disparate manner to provide the substantially periodic motion in a vibration pattern such that a ratio of the eight electrodes and the vibration pattern is a non-integer number, and to measure the rotation about the sensitive axis of the HRG in response to the plurality of forcer signals.

DETAILED DESCRIPTION

This disclosure relates generally to sensing systems, and specifically to a hemispherical resonator gyroscope (HRG). An HRG can include a sensing system and a controller. The controller includes a signal generator that can generate a plurality of forcer signals based on a respective set of equations that dictate the voltage of the forcer signals. The forcer signals are provided to a set of electrodes associated with the sensing system (e.g., eight electrodes) that are arranged in symmetrical annular arrangement about a sensitive axis. The forcer signals can thus be configured to electrostatically force a resonator (e.g., a hemispherical resonator) into a substantially periodic vibration pattern based on the application of the forcer signals to the electrodes. The vibration pattern can be such that a ratio of the number of electrodes and the vibration pattern is a non-integer number. For example, the number of electrodes can be eight, such that the forcer signals can generate a substantially periodic N=3 vibration pattern.

The controller is configured to calculate an angular rate of rotation of the sensor about the input axis based on measuring pickoff associated with the electrodes. For example, the forcer signals can be applied to a first set of the electrodes (e.g., four electrodes), such that the controller can be configured to measure pickoff signals from four pickoff electrodes. The pickoff electrodes and the forcer electrodes can be substantially equal and interleaved with respect to each other. As another example, the forcer signals can be associated with the respective plurality of electrodes, such as on a one-for-one basis, such that the controller is configured to implement pickoff via the respective plurality of electrodes substantially concurrently with providing the forcer signals.

Figure 1:
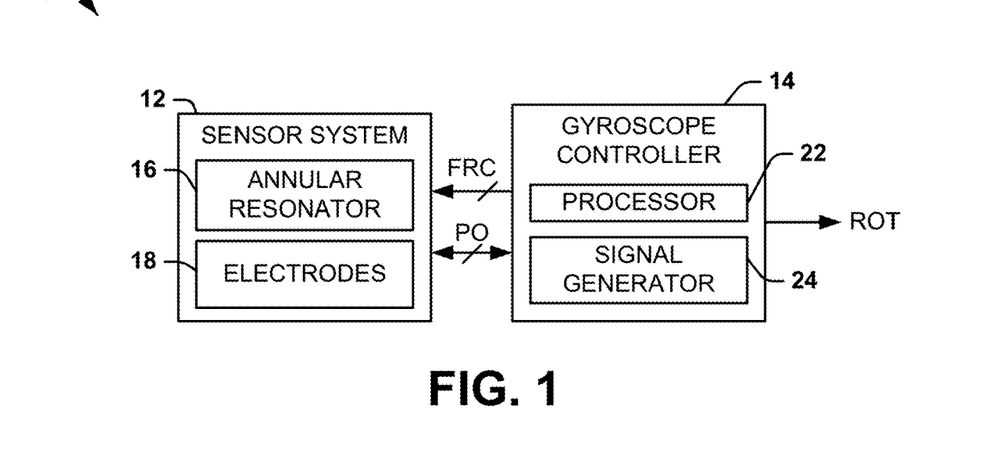
FIG. 1 illustrates an example of a hemispherical resonator gyroscope (HRG).

FIG. 1 illustrates an example of a hemispherical resonator gyroscope (HRG) system 10. The HRG 10 can be implemented in any of a variety of applications with which accurate measurement of rotation may be necessary, such as aerospace and nautical navigation. The HRG 10 includes a sensing system 12 and a controller 14.

The sensing system 12 includes an annular resonator 16 that can be arranged as a deformable material having an elastic property and being provided in one of a variety of different forms. For example, the annular resonator 16 can be an elastic hemisphere. The sensing system 12 also includes a set of electrodes 18 that are arranged internally with respect to the annular resonator 16, such that the annular resonator 16 substantially surrounds the electrodes 18. The electrodes 18 are configured to generate electrostatic force in response to forcer signals FRC provided by the controller 14 to provide deformation of the annular resonator 16, such as to provide a periodic motion of the annular resonator 16 in a vibration pattern. As an example, the vibration pattern can be such that a ratio of the number of electrodes and the number of nodes and antinodes of the vibration pattern is a non-integer number. For example, the quantity of the electrodes can be eight, such that the forcer signals FRC can generate a substantially periodic N=3 vibration pattern. As described herein, the term "N=3" describes half the number of antinodes of the vibration pattern, such that for N=3, the vibration pattern provides for six antinodes of the annular resonator 16 along the six substantially equally angularly separated principle axes.

As an example, the electrodes 18 can be implemented to provide force-rebalance of the angular displacement of the standing wave on the annular resonator 16 and concurrently provide nulling of the quadrature effects that can degrade or otherwise affect the standing wave. In addition, the electrodes 18 can include and/or can be implemented as pickoff electrodes that can provide pickoff signals PO corresponding to the motion of the annular resonator 16 to measure the rotation of the sensing system 12 about the sensitive axis. Thus, as a first example, the electrodes 18 can include dedicated forcer electrodes and pickoff electrodes, or as a second example, the electrodes 18 could implement dual forcer and pickoff functionality.

The controller 14 includes a processor 22 and a signal generator 24. The signal generator 24 is configured to generate the forcer signals FRC that are provided to the electrodes 18 based on the pickoff signals PO that are provided to the sensing system 12 (e.g., via the signal generator 24) for capacitive measurement of the of the deformation of the annular resonator 16 with respect to the electrodes 18 via the processor 22. As an example, the forcer signals FRC that are generated by the signal generator 24 can include a number of forcer signals FRC that is a proper subset of the number of electrodes 18. The forcer signals FRC can be provided to a first portion of the electrodes 18 to provide the periodic motion of the annular resonator 16 in response to one or more of the pickoff signals PO. The pickoff signals PO can be provided to the processor 22 that generates the forcer signals FRC based on a set of distinct equations that are associated with a disparate phase of resultant electrostatic forces provided via the electrodes 18. Thus, the equations can control the amplitude of the electrostatic force and provide a measure of the rate of angular rotation of the sensing system 12 about the sensitive axis, and also control quadrature effects. Thus, the controller 14 can provide the measurement of the angular rate of rotation about the input axis as an output signal ROT based on the pickoff signals.

By implementing a non-integer ratio between the number of electrodes 18 and the vibration pattern, such as based on implementing an N=3 vibration pattern with eight electrodes 18, the HRG 10 can achieve a number of advantages relative to typical HRGs, such as those that implement an N=2 vibration pattern. For example, the HRG 10 can substantially mitigate noise that results from cross-talk between the rate drive and a 1-ω amplitude drive, such as a drive that utilizes sinusoidal forcing signals that vary at the vibration frequency of the resonator, and can substantially mitigate bias instability that results from coupling of the between the 1-ω quadrature drive and the drive. As another example, the HRG 10 that implements N=3 with eight electrodes 18 can provide quadrature control that utilizes DC voltages while still maintaining a parametric rate drive for standing-wave amplitude control that utilizes sinusoidal voltages that vary at twice the vibration frequency of the annular resonator 16. Additionally, the N=3 vibration pattern can provide better decoupling of vibratory energy associated with a mounting stem, as opposed to an N=2 vibration pattern, that can cause errors in the measured rotation ROT. Furthermore, the N=3 vibration pattern can be implemented at substantially higher frequency than an N=2 vibration pattern, thus enabling increase of the fundamental digital signal processing rate for a higher measurement bandwidth. Accordingly, the HRG 10 can provide an improved rotation measurement system than other HRGs that implement an N=2 vibration pattern, and can be implemented in existing physics packages that include an annular resonator and eight electrodes to implement an N=2 vibration pattern without changing the physical structure.

Figure 2:
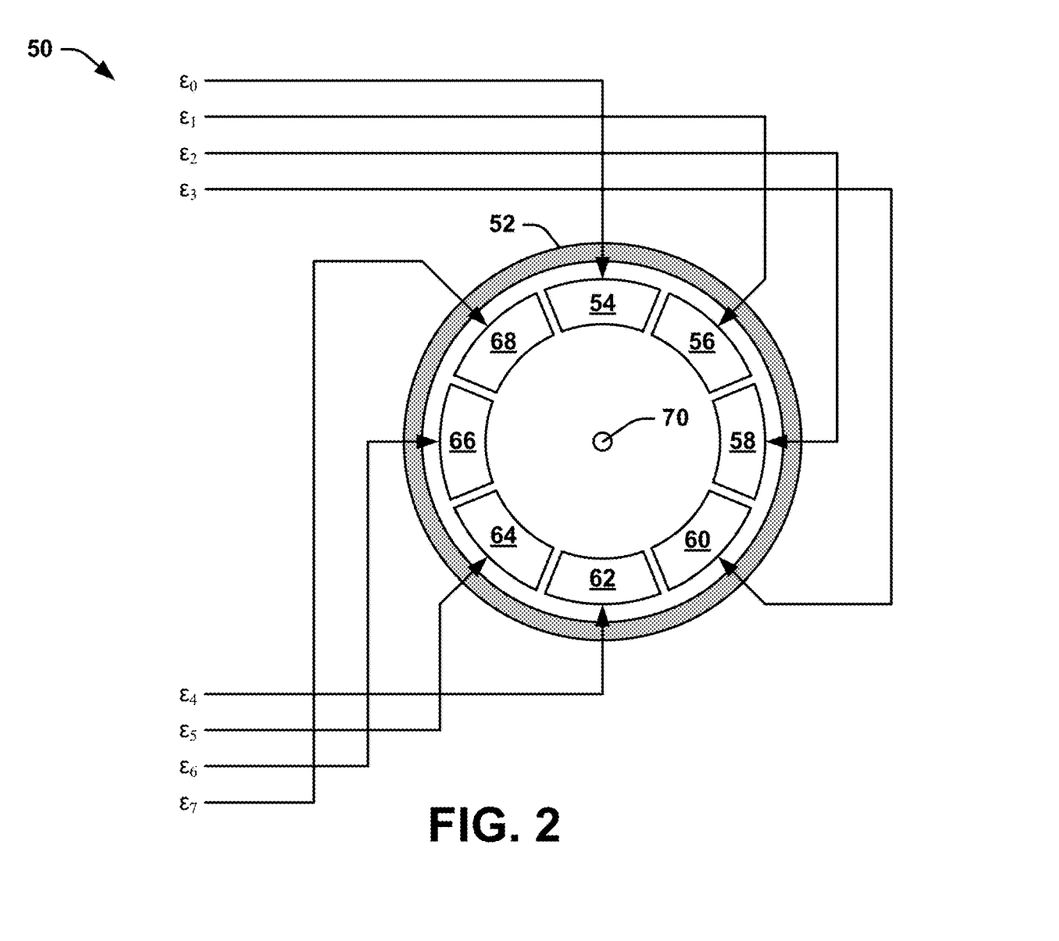
FIG. 2 illustrates an example of a sensing system.

FIG. 2 illustrates an example of a sensing system 50. The sensing system 50 can correspond to the sensing system 12 in the example of FIG. 1. Therefore, reference is to be made to the example of FIG. 1 in the following description of the example of FIG. 2.

The sensing system 50 includes an annular resonator 52 that substantially surrounds a plurality of electrodes. As an example, the annular resonator 52 can be configured as an elastic hemispherical shell, but could have other geometric arrangements (e.g., an elastic ring). The plurality of electrodes includes a first electrode 54, a second electrode 56, a third electrode 58, a fourth electrode 60, a fifth electrode 62, a sixth electrode 64, a seventh electrode 66, and an eighth electrode 68. The electrodes 54, 56, 58, 60, 62, 64, 66, and 68 are arranged in an oppositely-disposed symmetrical annular arrangement about a sensitive axis 70, demonstrated as perpendicular to the plane of the page of FIG. 2, and thus perpendicular to the axes associated with the vibration pattern, as described in greater detail herein.

In the example of FIG. 2, the electrodes 54, 56, 58, 60, 62, 64, 66, and 68 are provided signals ε that can correspond to forcer signals and/or pickoff signals. A first signal $\varepsilon_0$ is demonstrated as being provided to the first electrode 54, a second signal $\varepsilon_1$ is demonstrated as being provided to the second electrode 56, a third signal $\varepsilon_3$ is demonstrated as being provided to the third electrode 58, and a fourth signal $\varepsilon_3$ is demonstrated as being provided to the fourth electrode 60. Similarly, a fifth signal $\varepsilon_4$ is demonstrated as being provided to the fifth electrode 62, a sixth signal $\varepsilon_5$ is demonstrated as being provided to the sixth electrode 64, a seventh signal $\varepsilon_6$ is demonstrated as being provided to the seventh electrode 66, and an eighth signal $\varepsilon_7$ is demonstrated as being provided to the eighth electrode 68. While the example of FIG. 2 demonstrates that a signal ε is provided to each of the electrodes 54, 56, 58, 60, 62, 64, 66, and 68, it is to be understood that a proper subset of the signals ε can be provided as forcer voltages ε to a respective proper subset of the electrodes 54, 56, 58, 60, 62, 64, 66, and 68, such as in the example of some of the electrodes 54, 56, 58, 60, 62, 64, 66, and 68 being dedicated to pickoff.

In response to the application of the signals ε provided as forcer voltages, the electrodes 54, 56, 58, 60, 62, 64, 66, and 68 can provide an electrostatic force that acts upon the annular resonator 52. In response, the annular resonator 52 is electrostatically attracted to the electrodes 54, 56, 58, 60, 62, 64, 66, and 68 based on a relative phase of the forcer voltages ε, and thus a relative phase of the electrostatic forces. As a result, the annular resonator 52 is deformed in an N=3 vibration pattern. The state of the annular resonator 52 in response to the application of the forcer voltages ε is demonstrated in the examples of FIGS. 3 and 4.

Figure 3:
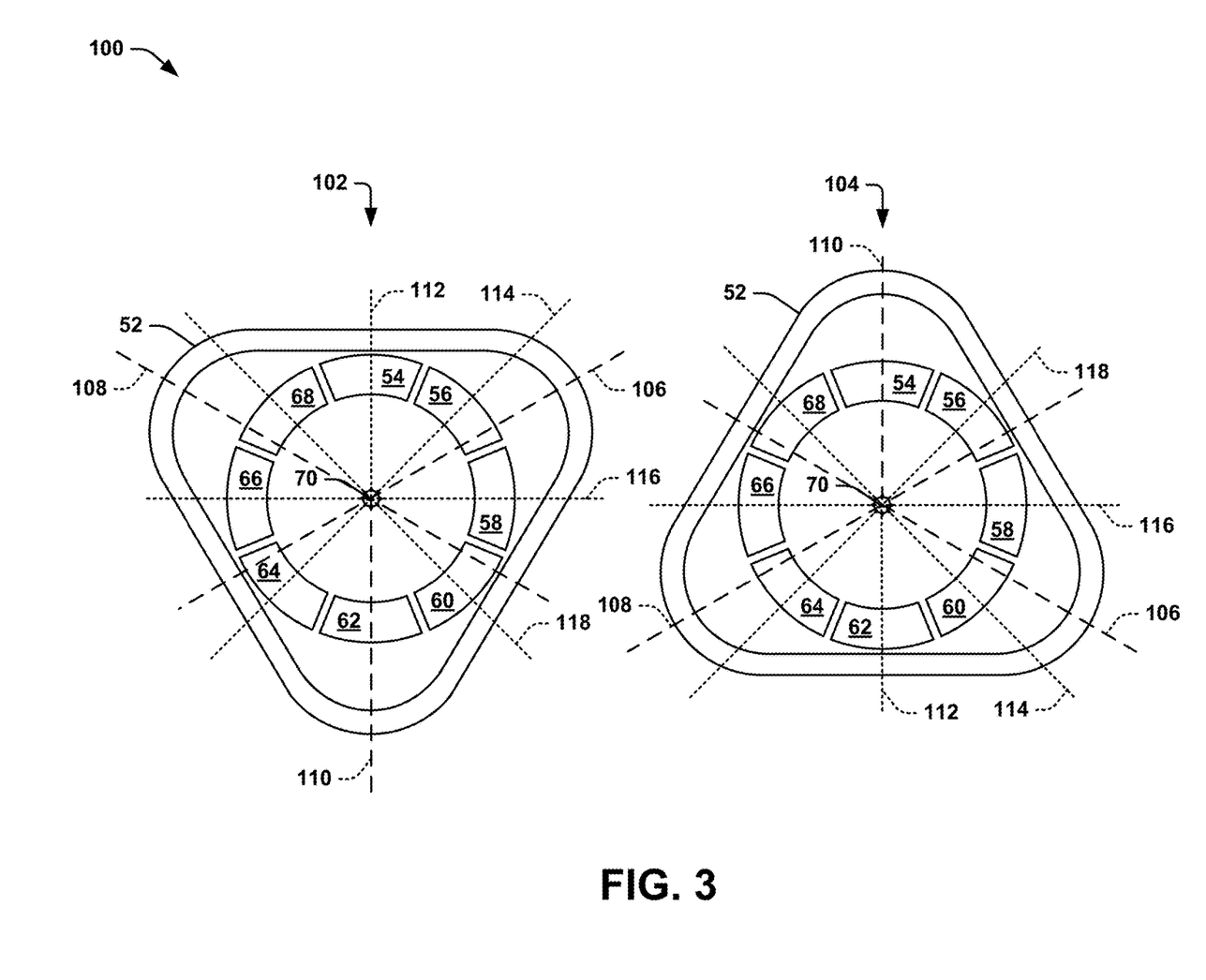
FIG. 3 illustrates an example diagram of periodic motion of a resonator sensing system.
Figure 4:
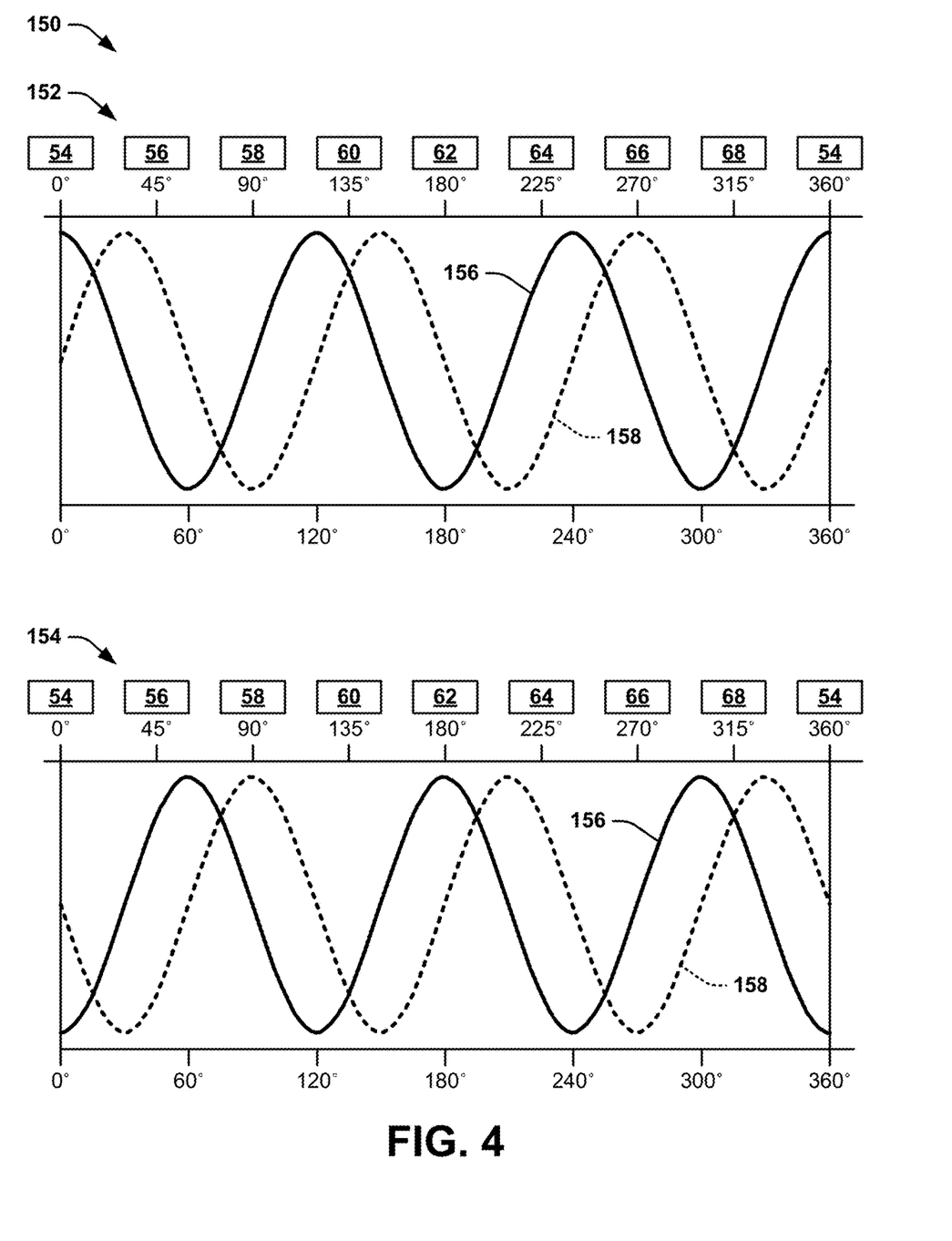
FIG. 4 illustrates an example of a phase diagram.

FIG. 3 illustrates an example diagram 100 of N=3 periodic motion of a resonator sensing system, and FIG. 4 illustrates an example of a phase diagram 150. Due to the elastic property of the annular resonator 52, the annular resonator 52 can rebound at approximately half of a period of the resonant frequency. In response, the annular resonator 52 oscillates between a first state corresponding to a time T=0 and a second state corresponding to a time T=1/2F, where F is the vibration frequency of the vibration pattern. The first state is demonstrated in the example of FIG. 3 at 102 and in the example of FIG. 4 at 152. The second state is demonstrated in the example of FIG. 3 at 104 and in the example of FIG. 4 at 154.

In the first state 102 in the example of FIG. 3, corresponding to the time T=0, the annular resonator 52 is demonstrated as being extended and contracted along three 120° axes, demonstrated as 106, 108, and 110, and also demonstrates four 90° axes 112, 114, 116, and 118 defined by the electrodes 54, 56, 58, 60, 62, 64, 66, and 68, with the axis 110 being collinear with the axis 112. In the first state 152 in the example of FIG. 4, corresponding to the time T=0, the phase diagram 150 demonstrates a solid-line 156 corresponding to the drive voltage, as applied to the electrodes 54, 56, 58, 60, 62, 64, 66, and 68, and a dotted-line 158 corresponding to the pickoff signal, as detected at the electrodes 54, 56, 58, 60, 62, 64, 66, and 68. In the second state 104 in the example of FIG. 3, corresponding to the time T=1/2F, the annular resonator 52 is demonstrated as being extended and contracted along the three 120° axes 106, 108, and 110 in an equal and opposite manner relative to the first state 102. Therefore, the examples of FIGS. 3 and 4 demonstrate the motion and application of forcer and pickoff signals that correspond to the N=3 vibration pattern.

As a first example, a proper subset (e.g., four) of the signals ε are configured as forcer voltages. For example, the first electrode 54, the third electrode 58, the fifth electrode 62, and the seventh electrode 66 are provided the respective forcer voltages $\varepsilon_0$, $\varepsilon_2$, $\varepsilon_4$, and $\varepsilon_6$. In the first example, the signal generator 24 can generate the forcer voltages $\varepsilon_0$, $\varepsilon_2$, $\varepsilon_4$, and $\varepsilon_6$ as voltage signals that are defined as follows:

$$\varepsilon_0 = [E_A \sin \omega_3 t \cos 3\theta - (E_\Omega \sin \omega_3 t + E_Q \cos \omega_3 t) \sin 3\theta] - E_R \quad \text{Equation 1}$$

$$\varepsilon_2 = -[E_A \sin \omega_3 t \sin 3 + \theta(E_\Omega \sin \omega_3 t + E_Q \cos \omega_3 t) \cos 3\theta] - E_R \quad \text{Equation 2}$$

$$\varepsilon_4 = -[E_A \sin \omega_3 t \cos 3 - \theta(E_\Omega \sin \omega_3 t + E_Q \cos \omega_3 t) \sin 3\theta] - E_R \quad \text{Equation 3}$$

$$\varepsilon_6 = [E_A \sin \omega_3 t \sin 3\theta + (E_\Omega \sin \omega_3 t + E_Q \cos \omega_3 t) \cos 3\theta] - E_R \quad \text{Equation 4}$$

Where: $\varepsilon_0$ is a first forcer voltage associated with a respective first electrode 54;

$\varepsilon_2$ is a second forcer voltage associated with a respective third electrode 58;

$\varepsilon_4$ is a third forcer voltage associated with a respective fifth electrode 62;

$\varepsilon_6$ is a fourth forcer voltage associated with a respective seventh electrode 66;

$\omega_3$ is a resonant frequency of the N=3 mode vibration pattern;

θ is a predetermined pattern-location angle; and $E_X$ are voltage components.

In this example, the second electrode 56, the fourth electrode 60, the sixth electrode 64, and the eighth electrode 68 are provided pickoff signals $\varepsilon_1$, $\varepsilon_3$, $\varepsilon_5$, and $\varepsilon_7$. Thus, in this example, the second electrode 56, the fourth electrode 60, the sixth electrode 64, and the eighth electrode 68 are implemented for pickoff, and thus are implemented to detect the pickoff signals PO that indicate a position of the annular resonator 52 during the vibration pattern to determine rotation of the sensing system 50 about the sensitive axis 70.

Therefore, based on the generation of the forcer voltages $\varepsilon_0$, $\varepsilon_2$, $\varepsilon_4$, and $\varepsilon_6$, the first example has a mechanization that is functionally equivalent to a mechanization that implements an N=2 vibration pattern, but still has the advantages of the N=3 vibration pattern described previously. As an example, based on the relative voltages of the forcer voltages $\varepsilon_0$, $\varepsilon_2$, $\varepsilon_4$, and $\varepsilon_6$, the first electrode 54 can implement a first anti-node forcer function (e.g., X+) via the signal $\varepsilon_0$, the second electrode 56 can implement a first in-between pickoff function (e.g., X−/Y+) via the signal $\varepsilon_1$, the third electrode 58 can implement a second anti-node forcer function (e.g., Y−) via the signal $\varepsilon_2$, and the fourth electrode 60 can implement a second in-between pickoff function (e.g., X+/Y+) via the signal $\varepsilon_3$. Similarly, the fifth electrode 62 can implement a third anti-node forcer function (e.g., X−) via the signal $\varepsilon_4$, the sixth electrode 64 can implement a third in-between pickoff function (e.g., X+/Y−) via the signal $\varepsilon_5$, the seventh electrode 66 can implement a fourth anti-node forcer function (e.g., Y+) via the signal $\varepsilon_6$, and the eighth electrode 68 can implement a fourth in-between pickoff function (e.g., X−/Y−) via the signal $\varepsilon_7$.

As a second example, all eight of the electrodes 54, 56, 58, 60, 62, 64, 66, and 68 are provided the forcer voltages ε. Therefore, the first electrode 54 is provided a first forcer voltage $\varepsilon_0$, the second electrode 56 is provided a second forcer voltage $\varepsilon_1$, the third electrode 58 is provided a third forcer voltage $\varepsilon_2$, the fourth electrode 60 is provided a fourth forcer voltage $\varepsilon_3$, the fifth electrode 62 is provided a fifth forcer voltage $\varepsilon_4$, the sixth electrode 64 is provided a sixth forcer voltage $\varepsilon_5$, the seventh electrode 66 is provided a seventh forcer voltage $\varepsilon_6$, and the eighth electrode 68 is provided an eighth forcer voltage $\varepsilon_7$. In the second example, the signal generator 24 can generate the forcer voltages $\varepsilon_0$, $\varepsilon_1$, $\varepsilon_2$, $\varepsilon_3$, $\varepsilon_4$, $\varepsilon_5$, $\varepsilon_6$, and $\varepsilon_7$ as voltage signals that are defined as follows:

$$\varepsilon_0 = E_0 + E_{2\omega}\sin 2\omega_3 t - E_\Omega \sin 3\theta \sin \omega_3 t; \quad \text{Equation 5}$$

$$\varepsilon_1 = -E_3 + E_{2\omega}\sin 2\omega_3 t + \frac{\sqrt{2}}{2} E_\Omega(\cos 3\theta + \sin 3\theta)\sin \omega_3 t; \quad \text{Equation 6}$$

$$\varepsilon_2 = -E_0 + E_{2\omega}\sin 2\omega_3 t - E_\Omega \cos 3\theta \sin \omega_3 t; \quad \text{Equation 7}$$

$$\varepsilon_3 = E_3 + E_{2\omega}\sin 2\omega_3 t + \frac{\sqrt{2}}{2} E_\Omega(-\sin 3\theta + \cos 3\theta)\sin \omega_3 t; \quad \text{Equation 8}$$

$$\varepsilon_4 = E_0 + E_{2\omega}\sin 2\omega_3 t + E_\Omega \sin 3\theta \sin \omega_3 t; \quad \text{Equation 9}$$

-continued $$\varepsilon_5 = -E_3 + E_{2\omega}\sin2\omega_3 t - \frac{\sqrt{2}}{2}E_\Omega(\cos3\theta + \sin3\theta)\sin\omega_3 t;$$ Equation 10

$$\varepsilon_6 = -E_0 + E_{2\omega}\sin2\omega_3 t - E_\Omega\cos3\theta\sin\omega_3 t;$$ Equation 11

$$\varepsilon_7 = E_3 + E_{2\omega}\sin2\omega_3 t - \frac{\sqrt{2}}{2}E_\Omega(-\sin3\theta + \cos3\theta)\sin\omega_3 t.$$ Equation 12

Where: $\varepsilon_0$ is a first forcer voltage associated with a respective first electrode 54;
$\varepsilon_1$ is a second forcer voltage associated with a respective second electrode 56;
$\varepsilon_2$ is a third forcer voltage associated with a respective third electrode 58;
$\varepsilon_3$ is a fourth forcer voltage associated with a respective fourth electrode 60;
$\varepsilon_4$ is a fifth forcer voltage associated with a respective fifth electrode 62;
$\varepsilon_5$ is a sixth forcer voltage associated with a respective sixth electrode 64;
$\varepsilon_6$ is a seventh forcer voltage associated with a respective seventh electrode 66;
$\varepsilon_7$ is an eighth forcer voltage associated with a respective eighth electrode 68;
$\omega_3$ is a resonant frequency of the N=3 mode vibration pattern;
$\theta$ is a predetermined pattern-location angle; and
$E_X$ are voltage components, with $E_0$ and $E_3$ both being constants that are proportional to sin 6$\theta$ and cos 6$\theta$, respectively.

In this example, all eight of the electrodes 54, 56, 58, 60, 62, 64, 66, and 68 are provided the respective forcer voltages $\varepsilon_0$, $\varepsilon_1$, $\varepsilon_2$, $\varepsilon_3$, $\varepsilon_4$, $\varepsilon_5$, $\varepsilon_6$, and $\varepsilon_7$, as demonstrated in the example of FIG. 2. Additionally, in this example, all eight of the electrodes 54, 56, 58, 60, 62, 64, 66, and 68 are implemented for pickoff, and thus are implemented to detect the pickoff signals PO that are provided to the processor 22 that indicate a position of the annular resonator 52 during the vibration pattern to determine rotation of the sensing system 50 about the sensitive axis 70.

Therefore, based on the generation of the forcer voltages $\varepsilon_0$, $\varepsilon_1$, $\varepsilon_2$, $\varepsilon_3$, $\varepsilon_4$, $\varepsilon_5$, $\varepsilon_6$, and $\varepsilon_7$, the second example provides an implementation that provides a 2-$\omega$ parametric amplitude drive, DC quadrature control, and a 1-$\omega$ rate drive. Therefore, the second example can provide a substantially improved bias instability and noise reduction due to the decoupling of the frequencies of the respective drive signals. As an example, for a given pattern-location angle of 0°, the first electrode 54 can implement a first parametric drive and DC quadrature function via the signal $\varepsilon_0$, the second electrode 56 can implement a first in-between pickoff function (e.g., X–/Y+) via the signal $\varepsilon_1$, the third electrode 58 can implement a parametric drive, rate drive, and DC quadrature function via the signal $\varepsilon_2$, and the fourth electrode 60 can implement a second in-between pickoff function (e.g., X+/Y+) via the signal $\varepsilon_3$. Similarly, the fifth electrode 62 can implement a second parametric drive and DC quadrature function via the signal $\varepsilon_4$, the sixth electrode 64 can implement a third in-between pickoff function (e.g., X+/Y–) via the signal $\varepsilon_5$, the seventh electrode 66 can implement anti-node parametric drive and rate drive function via the signal $\varepsilon_6$, and the eighth electrode 68 can implement a fourth in-between pickoff function (e.g., X–/Y–) via the signal $\varepsilon_7$.

Figure 5:
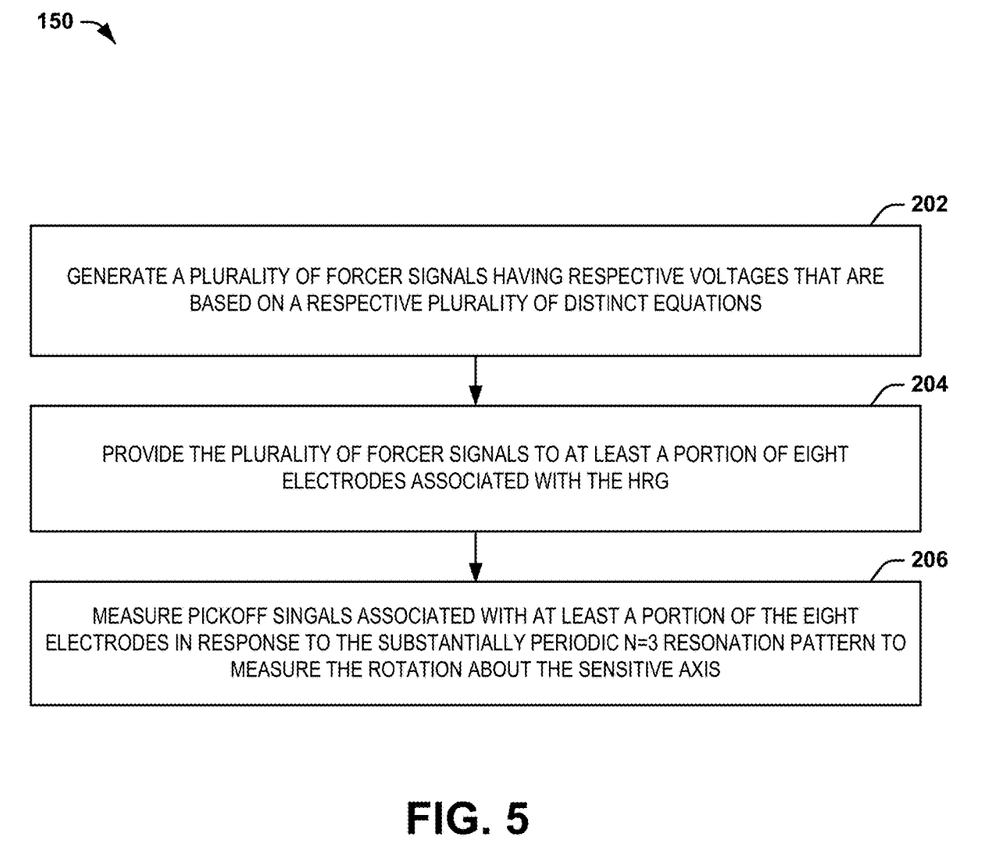
FIG. 5 illustrates an example of a method for controlling an HRG.

In view of the foregoing structural and functional features described above, a method in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 5 illustrates a method 200 for measuring rotation (e.g., the signal ROT) about a sensitive axis (e.g., the sensitive axis 70) of an HRG (e.g., the HRG 10). At 202, a plurality of forcer signals (e.g., the forcer signals FRC) are generated having respective voltages (e.g., the voltages $\varepsilon_0$, $\varepsilon_1$, $\varepsilon_2$, $\varepsilon_3$, $\varepsilon_4$, $\varepsilon_5$, $\varepsilon_6$, and $\varepsilon_7$) that are based on a respective plurality of distinct equations (e.g., Equations 1-4 or Equations 5-12). At 204, the plurality of forcer signals are provided to at least a portion of eight electrodes (e.g., the electrodes 18) associated with the HRG. The eight electrodes can be arranged in a symmetrical annular arrangement about the sensitive axis and can be configured to electrostatically force a resonator (e.g., the annular resonator 16) into a substantially periodic N=3 vibration pattern (e.g., demonstrated in the example of FIG. 3) based on the plurality of forcer signals applied to the at least a portion of the eight electrodes. At 206, a pickoff (e.g., the pickoff signals PO) associated with at least a portion of the eight electrodes is measured in response to the substantially periodic N=3 vibration pattern to measure the rotation about the sensitive axis.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A hemispherical resonator gyroscope (HRG) comprising:
    a sensing system comprising a plurality of electrodes arranged in a symmetrical annular arrangement about a sensitive axis and configured to electrostatically force a resonator into a substantially periodic motion based on a plurality of forcer signals applied to the plurality of electrodes, and configured to provide an indication of rotation about a sensitive axis of the HRG; and
    a controller configured to generate the plurality of forcer signals in a phase-disparate manner to provide the substantially periodic motion in a vibration pattern such that a ratio of the plurality of electrodes and the vibration pattern is a non-integer number, and to measure the rotation about the sensitive axis of the HRG in response to the plurality of forcer signals by measuring pickoff signals via the respective plurality of electrodes substantially concurrently with providing the plurality of forcer signals.

2. The HRG of claim 1, wherein the vibration pattern is an N=3 vibration pattern.

3. The HRG of claim 1, wherein the plurality of electrodes comprise eight electrodes configured to provide the vibration pattern in response to the plurality of forcer signals.

4. The HRG of claim 1, wherein the controller is configured to provide the plurality of forcer signals to at least a portion of the plurality of electrodes at a first time, and to measure pickoff signals associated with at least a portion of the plurality of electrodes at a second time to measure the rotation about the sensitive axis of the HRG.

5. The HRG of claim 1, wherein the controller is configured to provide the plurality of forcer signals in a force-rebalance manner to measure the rotation about the sensitive axis of the HRG.

6. The HRG of claim 1, wherein the controller is configured to generate the plurality of forcer signals for at least a portion of the plurality of electrodes having respective voltages that are based on a respective plurality of distinct equations.

7. The HRG of claim 6, wherein the plurality of forcer signals are associated with a relative phase of the plurality of forcer voltages with respect to the plurality of electrodes.

8. The HRG of claim 6, wherein the plurality of forcer signals are associated with a first set of the plurality of electrodes, wherein the controller is configured to implement measurement of pickoff signals via a second set of the plurality of electrodes, wherein the first set and the second set are equal and interleaved with respect to each other.

9. The HRG of claim 8, wherein the plurality of forcer signals comprise:

$\varepsilon_0 = [E_A \sin \omega_3 t \cos 3\theta - (E_\Omega \sin \omega_3 t + E_Q \cos \omega_3 t)\sin 3\theta] - E_R$;

$\varepsilon_2 = -[E_A \sin \omega_3 t \sin 3\theta + (E_\Omega \sin \omega_3 t + E_Q \cos \omega_3 t)\cos 3\theta] - E_R$;

$\varepsilon_4 = -[E_A \sin \omega_3 t \cos 3\theta - (E_\Omega \sin \omega_3 t + E_Q \cos \omega_3 t)\sin 3\theta] - E_R$;

$\varepsilon_6 = [E_A \sin \omega_3 t \sin 3\theta + (E_\Omega \sin \omega_3 t + E_Q \cos \omega_3 t)\cos 3\theta] - E_R$;

Where: $\varepsilon_0$ is a first forcer voltage associated with a respective first electrode;
$\varepsilon_2$ is a second forcer voltage associated with a respective third electrode;
$\varepsilon_4$ is a third forcer voltage associated with a respective fifth electrode;
$\varepsilon_6$ is a fourth forcer voltage associated with a respective seventh electrode;
$\omega_3$ is a resonant frequency of the vibration pattern;
$\theta$ is a predetermined pattern-location angle; and
$E_X$ are voltage components.

10. The HRG of claim 1, wherein the plurality of forcer signals comprise:

$\varepsilon_0 = E_0 + E_{2\omega}\sin 2\omega_3 t - E_\Omega \sin 3\theta \sin \omega_3 t$;

$\varepsilon_1 = -E_3 + E_{2\omega}\sin 2\omega_3 t + \frac{\sqrt{2}}{2}E_\Omega(\cos 3\theta + \sin 3\theta)\sin \omega_3 t$;

$\varepsilon_2 = -E_0 + E_{2\omega}\sin 2\omega_3 t - E_\Omega \cos 3\theta \sin \omega_3 t$;

$\varepsilon_3 = E_3 + E_{2\omega}\sin 2\omega_3 t + \frac{\sqrt{2}}{2}E_\Omega(-\sin 3\theta + \cos 3\theta)\sin \omega_3 t$;

-continued $\varepsilon_4 = E_0 + E_{2\omega}\sin 2\omega_3 t + E_\Omega \sin 3\theta \sin \omega_3 t$;

$\varepsilon_5 = -E_3 + E_{2\omega}\sin 2\omega_3 t - \frac{\sqrt{2}}{2}E_\Omega(\cos 3\theta + \sin 3\theta)\sin \omega_3 t$;

$\varepsilon_6 = -E_0 + E_{2\omega}\sin 2\omega_3 t - E_\Omega \cos 3\theta \sin \omega_3 t$;

$\varepsilon_7 = E_3 + E_{2\omega}\sin 2\omega_3 t - \frac{\sqrt{2}}{2}E_\Omega(-\sin 3\theta + \cos 3\theta)\sin \omega_3 t$.

Where: $\varepsilon_0$ is a first forcer voltage associated with a respective first electrode; $\varepsilon_0$
$\varepsilon_1$ is a second forcer voltage associated with a respective second electrode;
$\varepsilon_2$ is a third forcer voltage associated with a respective third electrode;
$\varepsilon_3$ is a fourth forcer voltage associated with a respective fourth electrode;
$\varepsilon_4$ is a fifth forcer voltage associated with a respective fifth electrode;
$\varepsilon_5$ is a sixth forcer voltage associated with a respective sixth electrode;
$\varepsilon_6$ is a seventh forcer voltage associated with a respective seventh electrode;
$\varepsilon_7$ is an eighth forcer voltage associated with a respective eighth electrode;
$\omega_3$ is a resonant frequency of the vibration pattern;
$\theta$ is a predetermined pattern-location angle; and
$E_X$ are voltage components.

11. A hemispherical resonator gyroscope (HRG) comprising:
a sensing system comprising eight electrodes arranged in a symmetrical annular arrangement about a sensitive axis and configured to electrostatically force a resonator into a substantially periodic N=3 vibration pattern based on a plurality of forcer signals applied to the eight electrodes, and configured to provide an indication of rotation about a sensitive axis of the HRG; and
a controller configured to generate the plurality of forcer signals in a phase-disparate manner to provide the substantially periodic motion in a vibration pattern such that a ratio of the eight electrodes and the vibration pattern is a non-integer number, and to measure the rotation about the sensitive axis of the HRG in response to the plurality of forcer signals by measuring pickoff signals via the respective eight electrodes substantially concurrently with providing the plurality of forcer signals.

12. The HRG of claim 11, wherein the controller is configured to provide the plurality of forcer signals in a force-rebalance manner to measure the rotation about the sensitive axis of the HRG.

13. The HRG of claim 11, wherein the plurality of forcer signals are associated with four forcer electrodes of the eight electrodes, wherein the controller is configured to implement measurement of pickoff signals via four pickoff electrodes of the eight electrodes, wherein the forcer and pickoff electrodes are equal and interleaved with respect to each other.

* * * * *